Aug. 16, 1966 M. J. HOEK ET AL 3,267,427

RHYTHMIC TELEGRAPH SYSTEM FOR THE SIMULTANEOUS TRANSMISSION OF MESSAGES IN OPPOSITE DIRECTIONS

Filed Jan. 21, 1963

INVENTOR
MARTINUS J. HOEK
ERNEST GOLDSTERN
BY
Frank R. Trifari
AGENT 3,267,427
Patented August 16, 1966

3,267,427

RHYTHMIC TELEGRAPH SYSTEM FOR THE SIMULTANEOUS TRANSMISSION OF MESSAGES IN OPPOSITE DIRECTIONS

Martinus Jacobus Hoek and Ernest Goldstern, Hilversum, Netherlands, assignors to North American Philips Company, Inc., New York, N.Y., a corporation of Delaware Filed Jan. 21, 1963, Ser. No. 252,955
Claims priority, application Netherlands, Jan. 26, 1962, 274,031
5 Claims. (Cl. 340—146.1)

Figure 1:
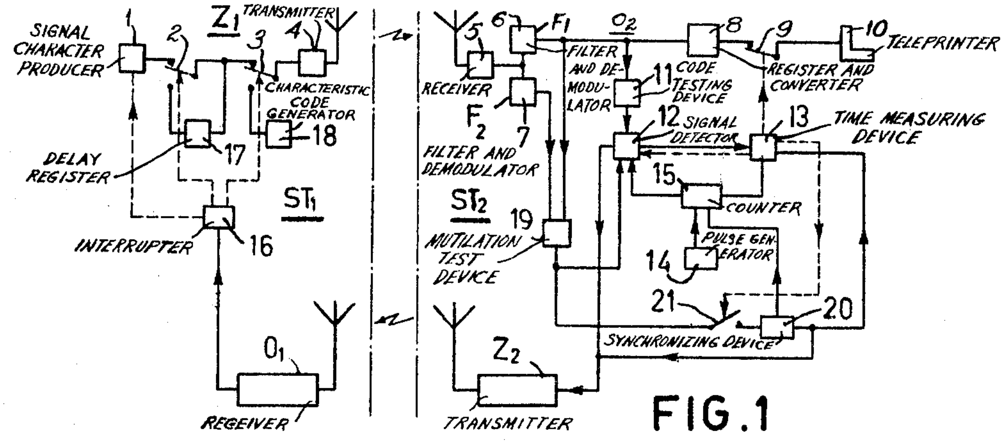

The invention relates to rhythmic telegraph systems for the simultaneous transmission of messages in opposite directions between two stations. The system is adapted to transmit signal characters consisting of a constant number of elements of equal duration in an error-detecting bivalent code. The receivers of the stations are provided with test devices which, upon reception of a signal character test the code thereof and respond on reception of a mutilated signal character. When a mutilated signal is received a request for repetition signal is transmitted by the corresponding transmitter. In response to a request for repeat signal, a signal detector at the other station causes the transmission of a pre-determined number of the most recently transmitted signal characters to be repeated. When the test device responds an interruptor is actuated which interrupts the transmission of the signal characters to a printing device for a period of repetition equal to the duration of the predetermined number of signal characters.

In this known system a transmitter and a co-operating receiver may be permanently in the repeating condition if the receiver is out-of-phase with the transmitted signal characters with respect to the beginning of the signal characters. It is true that at the beginning of operation the receiver is once adjusted to the beginning of the mark signals, however, this relationship may be lost due to a long-time disturbance of the transmission. The out-of-phase condition causes the received mark signals to be shifted with respect to the transmitted mark signals so that after each repeating period the code testing device responds and a request for repetition is sent back to the receiver.

It is an object of the invention to synchronize the receiver automatically with respect to the beginning of the mark signals transmitted by the associated transmitter. In achieving this purpose the problem arises of determining the out-of-phase condition with certainty, for from the fact that a condition of continuous repetition is ascertained it cannot be deduced that the receiver is out of phase. The invention has the particular object of determining the out-of-phase condition and the in-phase-condition unambiguously. In periods during which the transmission is heavily disturbed, however, it is not always possible to determine the phase of the transmitted mark signals, but when the transmission conditions improve and an out-of-phase condition is ascertained in accordance with the invention the phase of the receiver is corrected. Thus, the transmitter and the receiver remain in the repeating state as long as an out-of-phase condition is ascertained and also as long as the phase condition cannot be determined with certainty, for example, owing to interference.

The rhythmical telegraph system according to the invention is characterized by a combination of measures which for the sake of clarity are set forth separately which measures taken together form the characteristic feature of the invention. The measures according to the invention consist in that (a) at the transmitter end a character generator is provided which, when the signal detector has responded, transmits a pre-determined characteristic code character instead of a signal character, said code character containing elements which are constituted by intentionally mutilated signal elements;

(b) at the receiver end a further testing device is provided which tests each element immediately on reception and responds on ascertaining a mutilation;

(c) at the receiver end a code character detector is provided which is controlled by the further testing device and responds on reception of the characteristic code character;

(d) at the receiver end a phase comparison device is provided which compares the phase of the characteristic code character detected by the code character detector with the phase of a pulse generator which has a period equal to the length of a signal character and causes the received signal characters to be fed to a printing device;

(e) at the receiver end a recording device is provided which is controlled by the further testing device and by the code character detector and which performs a recording operation when in a repetition period a mutilated character element is received which does not form part of the code character detected by the code character detector;

(f) provided that the recording device has not recorded a mutilated element, the phase comparison device responds on ascertaining a phase difference and applies a shifting pulse to a phase shifting device which is coupled to the pulse generator and on reception of a shifting pulse shifts the phase of the pulse generator one element;

(g) the response of the phase comparison device and the recording of a mutilated element by the recording device result in that at the end of a repetition period a request for repetition is transmitted to the transmitter end, and the interruptor is again actuated during a repetition period.

The advantage of the telegraph system in accordance with the invention consists in that the out-of-phase condition can be rapidly ascertained so as to avoid that the transmitter and the receiver unnecessarily remain in the repetition condition.

Figures 2, 3:
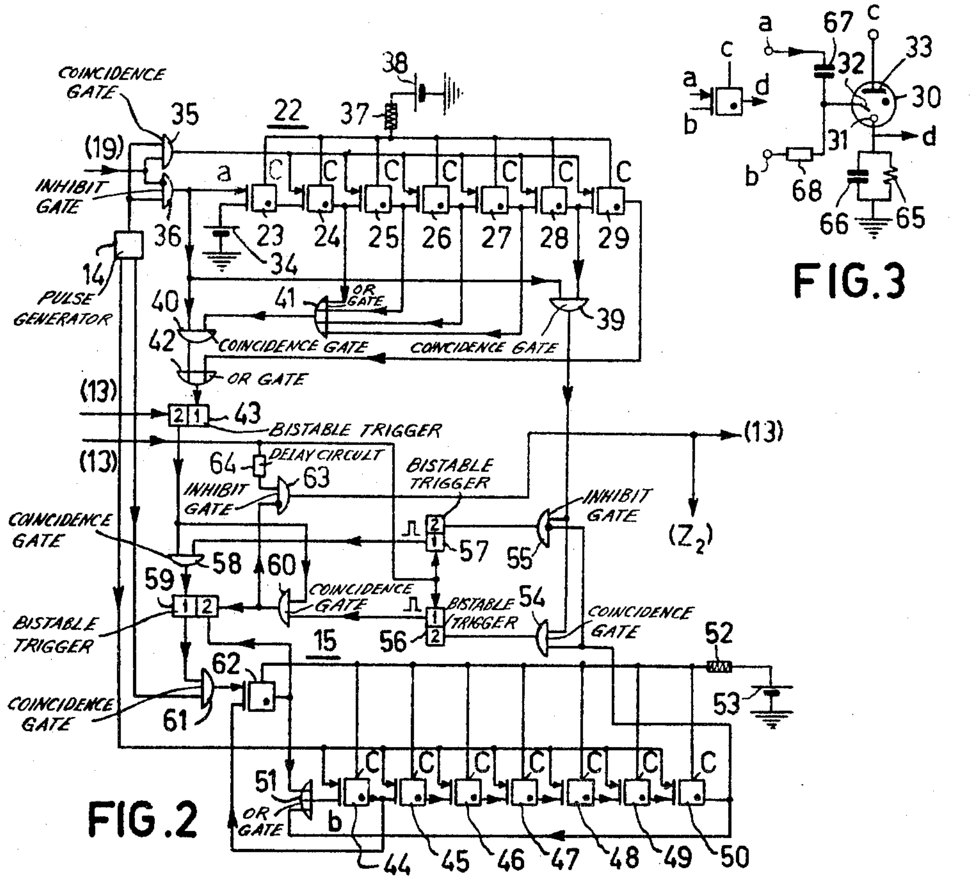

In order that the invention may readily be carried into effect, an embodiment thereof will now be described, by way of example, with reference to the accompanying diagrammatic drawings, in which FIG. 1 is a block-schematic diagram of two co-operating transmitting and receiving stations, FIG. 2 shows in greater detail an embodiment of the synchronizing device, and FIG. 3 a circuit including a gas-filled tube and the symbol used for this circuit.

FIG. 1 shows schematically two co-operating stations $ST_1$ and $ST_2$. The stations each comprise a transmitter $Z_1$ and $Z_2$ and a receiver $O_1$ and $O_2$ respectively. For the transmission of telegrams from the station $ST_1$ to the station $ST_2$ the transmitter $Z_1$ co-operates with the receiver $O_2$ by radio. When a telegram is transmitted from $ST_1$ to $ST_2$, another telegram is simultaneously transmitted from $ST_2$ to $ST_1$ by way of the transmitter $Z_2$ and the receiver $O_1$. If no such telegram is available, service characters are transmitted from $ST_1$ to $ST_2$. The signal characters are produced in the station $ST_1$ by a signal character producer 1 and supplied through rest contacts 2 and 3 to a radio transmitter 4. The mark and the space elements modulate the transmitter 4 with different frequencies $F_1$ and $F_2$ respectively. The radio signals are received by a radio receiver 5 which applies low-frequency output voltages to two channels 6 and 7 which pass the frequencies $F_1$ and $F_2$ respectively and deliver output direct voltages. The mark elements corresponding to the frequency $F_1$ are fed to a receiving register 8 having a delay time equal to the duration of a complete signal character.

The signal characters comprise seven code elements which each may be a mark element or a space element. The first element is a mark element if the five succeeding elements together form a telegraph character, and a space element if the five succeeding elements form a service character. The last element serves to render the code of a signal character error-detecting. For example, this element is a mark element if the number of mark elements among the six preceding elements is odd. Thus the total number of mark elements in a signal character always is an even number.

In the register 8 the received signal character is converted and transmitted by way of a rest contact to a teleprinter 10 in the form of a start-stop telegraph signal. The conversion consists in that the first element of a signal character is replaced by a start element and its last element is replaced by a stop element.

The receiver $O_2$ further comprises a testing device which tests the code of the received signal character for errors. This device counts the number of mark elements of the signal character; this number must be even. If an error is detected in the code, a signal is transmitted to a device 12 which responds thereto and supplies a signal to a time-measuring device 13. This device then opens the rest contact 9 which forms the connection between the register 8 and the teleprinter 10. The duration of the signal elements is 20 msecs. Every 20 msecs. a pulse generator 14, which may, for example, be synchronized with the transmitter $Z_1$ in the manner shown in U.S. Patent 2,843,669, delivers a pulse to a counter 15 which counts these pulses and after every 140 msecs. applies a pulse to the time-measuring device 13. The device 13 counts these pulses and after four pulses, that is to say, after four signal characters, returns the contact 9 to the rest condition. During this period a signal is also applied to the device 12 which thereby is rendered in-operative. The device 12 also transmits a signal to the transmitter $Z_2$, with the result that a request for repetition is sent back to the transmitter $Z_1$. On reception of this signal a signal detector in the receiver $O_1$ responds and a signal is transmitted to a device 16 of the transmitter $Z_1$. This device interrupts the transmission of the signal characters by the signal character producer 1 for the duration of four signal characters and moves the contact 3 to the work position for the duration of a signal character, after which the contact 3 is returned to the rest position and the contact 2 is moved to the work position for the duration of three signal characters.

In the transmitter the signal characters of the signal character producer 1 are supplied through the rest contact 2 not only to the radio transmitter 4 but also to a delay register 17 having a delay time equal to the duration of three signal characters. In this delay register the last three signal characters to be transmitted are temporarily stored. In accordance with the invention the transmitter includes a generator 18 which in the work position of the contact 3 produces a characteristic code character. This character comprises seven code elements. The first and last code elements are a space element or a work element which modulate the radio transmitter 4 with the frequency $F_2$ or the frequency $F_1$, respectively. The five intermediate elements are deliberately mutilated signal character elements. These elements modulate the radio transmitter, for example, with a frequency $F_3$ which lies between the frequencies $F_1$ and $F_2$ which correspond to the mark and space elements. Alternatively the said five elements may be formed in the manner described in co-pending patent application Ser. No. 175,448, filed Feb. 26, 1962. According to the method described therein each element consists of a conversion of a mark element or a space element, that is to say, in the middle of each of these elements the modulation of the transmitter 4 with the frequency $F_1$ is converted to a modulation with the frequency $F_2$, or conversely.

In the work position of the contact 2 the output of the delay register 17 is connected to its input and also, through the rest contact 3, to the radio transmitter 4. In this period the signal characters stored in the register 17 are again transmitted. In the receiver $O_2$ these signal characters are received exactly four signal characters later than the first time. At the instant at which the contact 9 is returned to the rest position the signal character which was found to be unacceptable in the preceding reception is in the register 8. It is assumed that the signal character is now found to be acceptable. If the code testing device 11 again ascertains an error in the code of the signal character, the device 12 again responds and transmits a signal to the time-measuring device 13, which then again measures a repetition period and changes over the contact 9 to the work position. Further in this case a signal is again supplied to the transmitter $Z_2$ with the result that a request for repetition is again transmitted to the station $ST_1$.

In the telegraph system described by way of example the request for repetition is constituted by the characteristic code character produced by the generator 18 in the transmitter $Z_2$. The receiver $O_1$, which is built in the same manner as the receiver $O_2$, includes a further testing device 19 which scans each character element immediately upon reception and responds on reception of a mutilated character element. For this purpose the device compares the output direct voltages of the channels 6 and 7 during the middle portions of the signal character elements. These output voltages are equal if a frequency $F_3$ is received which lies between the frequencies $F_1$ and $F_2$, and are also equal if in the middle of a signal character element a mark element is converted to a space element, or conversely. On reception of a signal character the device 12 examines whether the code testing device 11 has ascertained an error in the code and whether the further testing device 19 has found a mutilated character element. If one or both of the devices 11 and 19 have ascertained an error the device 12 responds. The device 12 and the device 19 together form the signal detector for the request for repetition. After the request for repetition has been received, the device 12 of the transmitter $O_1$ transmits a signal to the transmitter $Z_1$.

According to the invention the receiver $O_2$ includes a synchronizing device 12 which is rendered operative during each repetition period. The time measuring device 13 moves the work contact 21 to the work position for the duration of four signal characters and in this position the output signals of the further testing device 19 are applied to a synchronizing device 20. This synchronizing device serves to ascertain with the aid of the characteristic code character transmitted by the transmitter whether the receiver $O_2$ is in synchronism with the transmitter $Z_1$ with respect to the beginning of the signal characters. As long as the synchronizing device 20 has not unambiguously ascertained the in-phase condition it supplies a signal to the transmitter $Z_2$ at the end of the repetition period, with the result that a demand for repetition is sent back, and also a signal is supplied to the time measuring device 13 which then measures a new repetition period. When the synchronising device 20 has with certainty ascertained the out-of-phase condition, a correction pulse is applied to the counter 15. Every 20 msecs. the pulse generator 14 applies a pulse to the counter 15 which distributes these pulses over seven outputs. Thus a pulse is produced at each of the outputs after 140 msecs. The pulse at the first output determines the beginning of a signal character and finally the pulse at the seventh output determines the end of the signal character. The character elements which are received at instants at which the counting device 15 delivers a pulse at the first output, are converted to start elements in the register 8. The character elements received at instants at which the counter 15 delivers a pulse at the seventh output are converted to stop elements in the register 8. In the in-synchronism or in-phase condition the element which is converted to a start element is the first character element of a signal character, and the element which is converted to a stop element is the last element of a signal character. During a prolonged radio disturbance during which the transmitter and the receiver are continuously in the repetition condition the phase relationship between the pulses of the counter 15 and the character elements of the received signal characters may be lost. For example the first character element of a signal character may not be received at the instant at which the counter 15 delivers a pulse at the first output but at the instant at which a pulse is delivered at the second output. The phase of the counter 15 with respect to the incoming signal character then is shifted one character element. The correcting pulses delivered by the synchronizing device 20 always shift the phase of the counter 15 the duration of one character element until the counter 15 is in phase with the received signal characters.

The synchronizing device 20 will now be described in more detail with reference to FIGURE 2. This device includes a detector 22 for the characteristic code character which comprises the cascade connection of stages 23 to 29.

In FIGURE 3 the symbol for each of the stages is shown together with a possible embodiment of this circuit. The circuit comprises a gas-filled tube 30 which is provided with a cathode 31, an ignition electrode 32 and an anode 33. The cathode 31 is connected to earth through the parallel connection of resistor 65 and a capacitor 66. The ignition electrode 32 is connected through a capacitor 67 to an ignition terminal *a* and through a resistor 68 to a bias voltage terminal *b*. The cathode 31 is connected to an output terminal *d* and the anode 33 to a terminal *c*. The gas-filled tube is ignited by simultaneously applying a bias voltage to the terminal *b* and a pulse to the terminal *a* and then delivers a positive potential at the output terminal *d*. The terminal *c* normally is connected through a resistor to the positive terminal of a supply source. The tube can be extenguished by applying a negative pulse to the terminal *c*. The output terminal of each of the stages 23 to 29 is connected to the bias terminal of the next stage. The bias terminal of the stage 23 is connected to the positive terminal of a battery 34 so that the stage 23 is ignited each time a pulse is applied to the terminal *a*. The ignition terminals of the stages 24 to 29 are connected to the output of a coincidence gate 35. The ignition terminal of the stage 23 is connected to the output of an inhibit gate 36. The terminals *c* are connected through a common anode resistor 37 to the positive terminal of a battery 38. When one of the tubes is ignited such a voltage is produced across the resistor 37 that any tube in the cascade connection which may have been ignited is extinguished. The gates 35 and 36 are controlled at an input terminal and an inhibit terminal respectively by the output signals of the further testing device 19. On reception of a mutilated character element the device 19 delivers a voltage such that the gate 36 passes to the non-conducting condition and the gate 35 passes to the conducting condition. Consequently, the gate 35 allows the passage of the pulses of the pulse generator 14 which applies a pulse to both gates every 20 msecs. On reception of a correct character element, that is to say, of a character element which is not mutilated, the testing device 19 will not deliver a voltage and the gate 36 allows the passage of the pulses of the pulse generator 14. The characteristic code character comprises a mark element or a space element, that is to say, a correct character element, followed by five mutilated character elements and a final space or mark element, that is to say, again a correct character element. On reception of the first character elements of the characteristic code character the stage 23 ignites and applies a bias voltage to the stage 24. The second character element is a mutilated element so that the stage 24 is ignited. On reception of the second mutilated element the stage 25 is ignited, and so on. On reception of the fifth mutilated character element the stage 28 is ignited. The output terminal of the stage 28 is connected to the input terminal of a coincidence gate 39. The last element of the characteristic code character is a correct element. On reception of this element a pulse is applied through the gate 36 to a second input of the coincidence gate 39 which then delivers a pulse at its output to indicate that the characteristic code character has been received. As has been described hereinbefore, on reception of a correct character element the gate 36 allows the passage of a pulse from the pulse generator 14. This pulse is also applied to an input terminal of a coincidence gate 40. A second input terminal of this coincidence gate is connected to the output terminal of an OR-gate 41 the input terminals of which are connected each to one of the output terminals, of the stages 24 to 27. If one of these stages is ignited it applies a voltage through the gate 41 at the second input of the coincidence gate 40. This results in that when a correct character element is received after one, two, three or four mutilated elements have already been received, the coincidence gate 40 delivers an output pulse. Such a situation may occur with interference of the radio transmission. A case may also occur where after reception of five mutilated character elements the next element is also mutilated. On reception of six mutilated elements in succession the stage 29 is ignited. The output terminal of this stage is connected to an input terminal of an OR-gate 42 the other input terminal of which is connected to the output terminal of the gate 40. The OR-gate 42 delivers a pulse at its output terminal when a pulse or a voltage is applied to one of its input terminals. The output pulse of the terminal 42 sets a bistable trigger circuit 43 to the state 1. This trigger circuit is set to the state 2 by the time-measuring device 13 at the beginning of a repetition period. If the trigger circuit 43 is in the state 1 this denotes that in a repetition period at least one mutilated character element has been received which does not form part of the characteristic code character. When this code character is received the coincidence gate 39 delivers a pulse at its output, as has been described hereinbefore.

The counter 15 is also shown in more detail in FIG. 2. This counter comprises the cascade connection of stages 44 to 50 which each are of the type shown in FIGURE 3. The ignition terminals of these stages are connected to an output of the pulse generator 14 which delivers a pulse at its output every 20 msecs. The output terminal of each of the stages 44 to 50 is connected to the bias terminal of the next stage, the output terminal of the stage 50 being connected to the bias terminal of the stage 44 through an OR-gate 51. The terminals *c* are connected through a common anode resistor 52 to the positive terminal of a battery 53. Normally one of the stages is in the ignited condition. The pulses of the pulse generator 14 each time ignite the next stage so that the already ignited stage is extinguished. The counter 15 has a cycle period of 140 msecs., that is to say, exactly the length of a signal character. The control pulses for the register 8 may be taken from the output terminals of the stages 44 to 50. The time interval during which the stage 44 is ignited corresponds to the first element of a signal character. The time interval during which the stage 45 is ignited corresponds to the second element and finally the time interval during which the stage 50 is ignited corresponds to the seventh character element. The output terminal of the stage 50 is connected to an input terminal of a coincidence gate 54 and to an inhibit terminal of an inhibit gate 55. In the time interval during which the stage 50 is ignited, that is to say, during the seventh character element of a signal character, the gate 54 is conducting and the gate 55 is non-conducting. If during this time interval an output pulse is delivered by the coincidence gate 39, this pulse is allowed to pass by the coincidence gate 54. If, however, the output pulse is produced in a time interval which corresponds to one of the first six character elements of a signal character, the pulse is passed by the gate 55. The output pulse of the gate 54 is applied to a trigger circuit 56, which it sets to the state 2. The output pulse of the gate 55 is applied to a trigger circuit 57, which it also sets to the state 2. If the trigger circuit 56 is in the state 2, it is recorded that the characteristic code character is received in the correct phase, for in this case the seventh element of the code character coincides with the time interval determined by the stage 50. If the trigger circuit 57 is in the state 2, it is recorded that the characteristic code character is not received in the correct phase. At the end of the repetition period the time measuring device 13 applies a pulse to both trigger circuits 56 and 57 and sets them to the state 1. In passing from the state 2 to the state 1 the trigger circuit concerned delivers an output pulse. If the trigger circuit was already in the state 1, it does not deliver an output pulse. The gate circuits 54 and 55 together form a phase comparison device which compares the phase of the characteristic code character with the phase of the counter 15. The output pulse of the trigger circuit 57 is applied to an input of the coincidence gate 58. The trigger circuit 43, which in that state 2 indicates that no mutilated character element has been received which does not form part of the characteristic code character, in this state applies a bias voltage to a second input of a coincidence gate 58 and opens this gate for the output pulse of the trigger circuit 57. The output pulse of the coincidence gate 58 sets a trigger circuit 59 to the state 1.

The trigger circuit 43 when in the state 2 also delivers a bias voltage for the coincidence gate 60 and opens this gate for the output pulse of the trigger circuit 56. The output pulse of the gate 60 sets the trigger circuit 59 to the condition 2. Thus the trigger circuit 59 when in the state 1 records that the counter 15 is out of phase with certainty, and when in the state 2 it records that the counter 15 is in phase with certainty with respect to the signal characters received. As long as the synchronizing device 20 has not ascertained the in-phase condition with certainty, a request for repetition is sent back after each repetition period. For this purpose the output pulse of the gate 60 is applied to the inhibit terminal of an inhibit gate 63, to the input terminal of which a pulse is supplied by the time measuring device 13 through a delay circuit 64 at the end of the repetition period. The delay time of the circuit 64 is such that its output pulse coincides with the output pulse of the gate 60. The latter pulse blocks the gate 63. If there is no such pulse, the output pulse of the circuit 64 is applied through the gate 63 to the time measuring device 13, which then measures a new repetition period, and to the transmitter $Z_2$, which then returns a request for repetition to the transmitter $Z_1$. In the state 1 the trigger circuit 59 applies a bias voltage to the coincidence gate 61 and opens this for the pulses applied to a second input. These pulses are delivered by the pulse generator 14 at instants which are shifted with respect to the instants at which the pulse generator 14 applies pulses to the ignition terminals of the stages 44 to 50. The output pulses of the coincidence gate 61 are the correction pulses which always shift the phase of the counter 15 one character element. The pulses are applied to the ignition terminal of a stage 62. The bias terminal of this stage is connected to the output terminal of the stage 44. As soon as the stage 44 is ignited it applies a bias to the stage 62 and the next subsequent output pulse of the coincidence gate 61 ignites the stage 62 which then applies a bias to the stage 44 through the OR-gate 51. The output voltage of the stage 62 also returns the trigger circuit 59 to the state 2. The next pulse of the pulse generator 14 applied to the ignition terminal of the stage 44 re-ignites that stage so that the phase of the counter 15 is shifted one character element.

As soon as synchronism with respect to the beginning of the signal characters has been reached, the trigger circuit 59 remains in the state 2 at the end of the repetition period and no more correcting pulses are applied to the counter 15. The code testing device 11 tests the code of the last signal character which is received before the end of the repetition signal. If it is now also found that this code is correct, the repetition is terminated and the signal character stored in the register 8 is fed to the teleprinter 10 through the rest contact 9. In this process the difficulty may arise that this signal character is not the signal character the mutilated reception of which has initiated the repetition. It is the same signal character if between the beginning and the end of the repetition a period elapses which is equal to an integral number of repetition periods. In order to achieve the in-phase condition with respect to the beginning of a repetition period also, use may be made of a so-called marked cycle. In such a marked cycle, the duration of which is equal to a repetition period, one of the signal characters is transmitted with opposite modulation. The mark elements of this signal character modulate the transmitter with the frequency $F_2$ instead of with the frequency $F_1$ and the rest elements with frequency $F_1$ instead of with the frequency $F_2$. During the reception of this signal character the output direct voltages of the channels 6 and 7 are interchanged in the receiver so that a normal signal character is produced at the receiver end. During a repetition period the code of the signal characters can also be checked. If, now, the characteristic code character is received in the correct phase, but by the code testing device the code of the other signal characters received in a repetition period is not found to be acceptable, the phase of the counter 15 is shifted until these signal characters are also received in the correct code. This ensures that on termination of the repetition the signal character stored in the register 8 is the signal character the mutilated reception of which has initiated the repetition. This provides the advantage that not a single signal character is lost and that a signal character which has already been printed is not printed again.

What is claimed is:

1. A rhythmic telegraph system for the simultaneous transmission of messages in opposite directions between two stations with the aid of signal characters which are constituted by a constant number of elements of equal duration in an error-detecting bivalent code, in which at the receiver end a testing device is provided which on reception of a signal character immediately tests its code and on reception of a distorted signal responds with the result that a request for repetition is sent back to the transmitter end and there causes a signal detector to respond which causes the transmission of a pre-determined number of the last transmitted signal characters to be repeated and, when the test device responds, at the receiver end an interruptor is actuated which interrupts the feeding of the signal characters to a printing device for a repetition period equal to the duration of the pre-determined number of signal characters, characterized in that (a) at the receiver end a character generator is provided which, when the signal detector responds, transmits a pre-determined characteristic code character instead of a signal character, said code character containing code elements which are constituted by an intentionally mutilated signal character element, (b) at the receiver end a further testing device is provided which scans each character element immediately on reception and responds on finding a mutilation, (c) at the receiver end a code character detector is provided which is controlled by the further testing device and responds on reception of the characteristic code character, (d) at the receiver end a phase comparison device is provided which compares the phase of the characteristic code character detected by the code character detector with the phase of a pulse generator which has a cycle period equal to the length of a signal character and causes the received signal characters to be fed to the printing device, (e) at the receiver end a recording device is provided which is controlled by the further testing device and by the code character detector and which performs a recording if in a repetition period a mutilated character element is received which does not form part of the code character detected by the code character detector, (f) the phase comparison device on ascertaining a phase difference responds, provided that the recording device has not recorded a mutilated character element, and applies a shifting pulse to a phase shifting device which is coupled to the pulse generator and on reception of a shifting pulse shifts the phase of said pulse generator one character element, (g) the response of the phase comparison device and the recording of a mutilated character element by the recording device result in that at the end of a repetion period a request for repetition is returned to the transmitter end and the interrupter is again actuated for a repetition period.

2. A telegraph transmission system comprising first and second stations, each of said stations comprising a transmitter and a receiver, said receivers comprising register means for storing received signals, pulse generating means for generating a pulse train of pulses having a cycle length equal to the length of a telegraph signal character, output means connected to said register means, means for detecting the reception of mutilated signals, means responsive to the detection of mutilated signals for disconnecting said output means from said register means for the duration of a predetermined number of pulse cycles of said pulse train, said transmitters comprising means responsive to the reception of mutilated signals by the corresponding receiver for stopping transmission of telegraph signals and for transmitting a characteristic code of mutilated and non-mutilated code elements for a predetermined time, said receivers comprising means responsive to the reception of said characteristic code for detecting a phase difference between the pulses of said pulse train and said characteristic code, and means responsive to said phase difference for changing the phase of said pulse train and for indicating to the corresponding transmitter that a mutilated signal has been received.

3. A rhythmic telegraph system for the simultaneous transmission of messages in opposite directions between first and second stations comprising first and second transmitters respectively and first and second receivers respectively, said second transmitter comprising means for transmitting a request for repeat signals, said first transmitter comprising means for transmitting telegraph signals, a source of a characteristic code of signals mutilated in a predetermined manner, and means responsive to reception of a request for repeat signal by said first receiver for interrupting the transmission of said telegraph signals and transmitting said characteristic code for a predetermined time, said second receiver comprising register means for storing received signals, pulse generating means for generating a pulse train of pulses having a cycle length equal to the length of a telegraph signal, output means connected to the output of said register means, means for detecting the reception of mutilated signals, means responsive to the detection of mutilated signals for disconnecting said output means from said register means for the duration of a predetermined number of pulse cycles of said pulse train, means responsive to the reception of said characteristic code for correcting the phase of said pulse train, and means for initiating the transmission of a request for repeat signal by said second transmitter when a mutilated signal is received.

4. A rhythmic telegraph system for the simultaneous transmission of messages in both directions between first and second stations comprising first and second transmitters respectively and first and second receivers respectively, said stations being adapted to send and receive telegraph signal characters consisting of a predetermined number of bivalent code elements of constant duration, said second transmitter comprising means for transmitting a request for repeat signal, said first transmitter comprising means for transmitting said signal characters, a source of a characteristic code signals of mutilated and non-mutilated code elements combined in a predetermined manner, and means responsive to the reception of a request for repeat signal by said first receiver for interrupting the transmission of said telegraph signals and transmitting said characteristic code for a predetermined time, said second receiver comprising a register for storing received signals, output circuit means connected to said register means, pulse generating means for generating a pulse train of pulses having a cycle length equal to the duration of said signal characters, means for detecting the reception of a mutilated signal, means responsive to the detection of a mutilated signal for disconnecting said output means from said register means for the duration of a predetermined number of signal characters, means responsive to the reception of said characteristic code for comparing the phase of said pulse train with said characteristic signal and for correcting the phase of said pulse train, and means for initiating the transmission of a request for repeat signal by said second transmitter when a mutilated signal is received.

5. A rhythmic telegraph system for the simultaneous transmission of messages in both directions between first and second stations comprising first and second transmitters respectively and first and second receivers respectively, said stations being adapted to send and receive telegraph signal characters consisting of an error detecting code of a predetermined number of bivalent code elements of constant duration, said second transmitter comprising means for transmitting a request for repeat signal, said first transmitter comprising means for transmitting said signal characters, a source of a characteristic code signals of mutilated and non-mutilated code elements combined in a predetermined manner, and means responsive to the reception of a request for repeat signal by said first receiver for interrupting the transmission of said signal characters and transmitting said characteristic code for a predetermined time, said register comprising a register for storing received signals, output circuit means connected to said register means, a source of a pulse train of pulses having a cycle length equal to the duration of said signal characters, means responsive to the reception of incorrect code signals for disconnecting said output circuit for a predetermined number of pulse train cycles and for signalling said second transmitter to transmit a request for repeat signal, means responsive to the reception of a mutilated signal for disconnecting said output circuit for a predetermined number of pulse train cycles, means for testing received mutilated signals for said characteristic code, means responsive to said characteristic code for comparing the phase of said characteristic code with said pulse train, and means responsive to a phase difference between said characteristic code and pulse train for changing the phase of said pulse train and signalling said second transmitter to send a request for repeat signal.

References Cited by the Examiner

UNITED STATES PATENTS 2,903,514 9/1959 Van Duuren ------- 340—146.1

ROBERT C. BAILEY, *Primary Examiner.*

M. LISS, *Assistant Examiner.*